US006079571A

United States Patent [19]

Stowell

[11] Patent Number: 6,079,571

[45] Date of Patent: Jun. 27, 2000

[54] OIL/WATER SEPARATOR

[76] Inventor: James Richard George Stowell, #38-2425 Mt. Baldy Drive, Kelowna, British Columbia, Canada, V1V 1Z3

[21] Appl. No.: 09/231,292

[22] Filed: Jan. 15, 1999

Related U.S. Application Data

[60] Provisional application No. 60/085,624, May 15, 1998.

[30] Foreign Application Priority Data

Oct. 30, 1998 [CA] Canada .................................. 2252307

[51] Int. Cl.[7] ........................................................ C02F 1/40

[52] U.S. Cl. ..................... 210/521; 210/538; 210/DIG. 5

[58] Field of Search .................................... 210/513, 521, 210/800, 802, DIG. 5, 538

[56] References Cited

U.S. PATENT DOCUMENTS

| | | | |
|---|---|---|---|
| 2,214,248 | 9/1940 | Hawley . | |
| 3,529,728 | 9/1970 | Middelbeek et al. . | |
| 3,904,524 | 9/1975 | Pelton et al. . | |
| 4,162,973 | 7/1979 | Lynch | 210/744 |
| 4,722,800 | 2/1988 | Aymong . | |
| 4,980,070 | 12/1990 | Lieberman . | |
| 5,108,609 | 4/1992 | Burt . | |
| 5,207,895 | 5/1993 | Basseen et al. . | |
| 5,423,984 | 6/1995 | Belden | 210/232 |
| 5,520,825 | 5/1996 | Rice . | |
| 5,554,301 | 9/1996 | Rippetoe et al. . | |
| 5,656,766 | 8/1997 | Horn et al. | 73/49.2 |

OTHER PUBLICATIONS

AFL Industries booklet Florida, USA pp. 2–14 from a booklet.

*Primary Examiner*—David A. Simmons
*Assistant Examiner*—Fred Prince
*Attorney, Agent, or Firm*—Antony C. Edwards

[57] ABSTRACT

An Oil/Water Separator apparatus includes a portable container advantageously having rigid sides, including spaced apart side walls and rigid floor. Within the rigid container are defined at least two, advantageously, three chambers in an adjacent array in a downstream direction. The chambers are separated by rigid separating partitions or baffles rigidly mounted to, so as to extend between, the opposite side walls of the container. Adjacent chambers are connected in fluid communication therebetween so that influent water containing oil to be separated may enter into a first upstream reservoir chamber. The influent water is deposited into the reservoir chamber. A downstream partition or baffle separates the reservoir chamber from the downstream coalescing chamber. The first partition has an opening under a lowermost edge thereof. Water passes under the partition from the reservoir chamber into the coalescing chamber. In the coalescing chamber, mounted in the water flow path, is a coalescing pack releasably rigidly mounted between the partition and a weir partition rigidly mounted to the floor. Emulsified oil within the water flow coalesces within the coalescing pack and is separated as oil droplets flow upwardly to the water surface within the coalescing chamber. The water flow leaving the coalescing pack is directed downwardly so as to pass into conduit passing over or through a downstream weir partition so as to flow into an outlet chamber.

24 Claims, 3 Drawing Sheets

18 12 28 14 16 52 24 48 F 44 50 20 22 34 46 40 E 26 A C 32 B 38 36 D 30 10

10
12
14
16
18
20
26
28
28
36
46
48
48
50
54
54
2
2
3
3

B
34
42a
42
40
34a
38
30
B
42
34b 34b
34
34a
42
34b

OIL/WATER SEPARATOR

CROSS REFERENCE TO RELATED APPLICATION

This application claims priority from U.S. Provisional Patent Application No. 60/085,624 filed May 15, 1998 titled Oil/Water Separator.

FIELD OF THE INVENTION

This invention relates generally to water pollution control systems and related apparatus. As water is used, particularly in connection with contemporary technology, the water becomes polluted as solids, foreign liquids, oils and greases become mixed with the water. Environmental awareness, evidenced by governmental laws and pursuant regulations, now requires that users treat waste water to remove pollutants before water may be returned or dumped into a stream or municipal storm sewer or sewage system.

BACKGROUND OF THE INVENTION

Applicant is aware of U.S. Pat. No. 4,162,973 which issued Jul. 31, 1979 to Lynch for a water polishing system. Lynch discloses pumping waste water continuously through a self-contained separating or polishing system to remove pollutants. Suspended solids are removed by mechanical filtration and emulsified oil is separated by coalescing the oil into floatable droplets which may then be skimmed from the surface of the water. Various three-way valves are employed in the operation of the system. The system includes a surge tank or other reservoir and a coalescing and outlet chamber containing a coalescing and oil accumulation sub-chamber, a weir sub-chamber and a clean water sub-chamber. Oil coalescers are mounted in-line at the water inlet to the coalescing and oil accumulation sub-chamber. From the coalescing and oil accumulation sub-chamber, the water flow path is directed under a baffle between the coalescing and oil accumulation sub-chamber and the weir sub-chamber. Water passes through the weir sub-chamber and over a baffle wall into the clean water sub-chamber from which the water exits through an outlet.

What is neither taught nor suggested is the simplified structure of the present invention wherein the separate surge tank and coalescing and outlet chambers of Lynch may be combined into a simplified portable structure wherein a first upstream reservoir chamber provides for surge settling and mechanical floatation separation of non-emulsified oil from the water flow, a second downstream coalescing chamber provides for removal of emulsified oil through a simplified in-line coalescing pack, and a third downstream outlet chamber is in downstream fluid communication with the coalescing chamber via a weir partition

SUMMARY OF THE INVENTION

Waste water containing solids and other insoluble pollutants such as oil may be first pre-treated for removal of settable solids and free oil. Separation of these pollutants may be obtained by allowing the waste water to remain in a holding area for a sufficient time period that solids are gravitationally settled to a bottom of the area and the free oil floats upward because of its relatively lower specific gravity.

With such pollutants separated and removed, waste water is then ready to be processed by apparatus as incorporated in this invention. Oil/water separation removes emulsified oils which were not separated in the pre-treatment.

Waste water produced by a user may vary considerably as to total amount, amount per period of time, and amount of emulsified oil per volume of water. The size of the apparatus will vary from installation to installation depending on these variables. A user may produce waste water in such quantities and in such a continuous manner that the system must operate continuously, or the system may need to be operated only intermittently to provide required separation upon accumulation of a certain quantity of waste water.

The system is self-contained with a self-supporting container allowing the user to locate the system as desired and only make external connections. The waste water enters the system into an appropriately sized surge tank. The waste water then passes into and through coalescers submerged within a coalescing and oil accumulation portion of the container or tank filled with waste water. The coalescers cause particles of suspended oil to accumulate and form into sufficiently large droplets or globules, that as the oil droplets or globules are forced from the coalescers, the droplets or globules rise to a surface of the waste water within the accumulation portion of the tank. As the film of oil globules grows on the surface, it may be selectively skimmed therefrom. The coelescers may be advantageously sheets of corrugated or planar sheets or the like, which may be of PVC, held in a framework in parallel array for example ¼ inch apart from each other so as to form flow channels between the closely spaced sheets.

From the coalescers the waste water flows in a downward direction and through a submerged opening into a downstream weir portion of the tank having a weir partition as one wall of the tank. The waste water flows over the weir partition or through an aperture in the weir partition and into a clean water outlet chamber where it may be gravity fed or pumped into a connecting sewer or other external accumulation means.

In summary, the Oil/Water Separator apparatus of the present invention comprises a portable container advantageously having rigid sides, including spaced apart side walls and rigid floor. A lid may be provided. Within the rigid container are defined at least two, advantageously, three chambers in an adjacent array in a downstream direction as better hereinafter defined. The chambers are separated by rigid separating partitions or baffles rigidly mounted to, so as to extend between, the opposite side walls of the container. Adjacent chambers are connected in fluid communication therebetween so that influent water containing oil to be separated may enter into a first upstream chamber, namely, a reservoir chamber. The influent water is deposited into the reservoir chamber a first distance above a base level defined as the floor of the rigid container. The floor extends generally horizontally along the length of the rigid container so as to provide a consistent base level in each of the chambers formed within the rigid container.

The first downstream partition or baffle separates the reservoir chamber from the next downstream chamber, namely, the coalescing chamber. The first partition has an opening under a lowermost edge thereof, between the lowermost edge and the base level. The lowermost edge of the first partition is spaced above the base level a second distance. Water passes under the first partition from the reservoir chamber into the coalescing chamber. In the coalescing chamber, mounted in the water flow path, is a coalescing pack releasably rigidly mounted between the first partition and a second partition or baffle, namely a first weir partition rigidly mounted to the floor so as to extend generally vertically into the coalescing chamber a third distance above the base level.

The coalescing pack is a rigid spaced apart array of rigid sheet members supported in closely spaced apart relation so as to define between each of the rigid sheet members in the spaced apart array a cavity or channel sized sufficiently to maintain laminar flow between each of the rigid sheet members. The rigid sheet members may be planar or corrugated so long as mounted within the coalescing pack so as to maintain in generally parallel relation the channels or cavities through which the water flows as it enters and passes through the coalescing chamber. The channels or cavities maybe upwardly inclined in the direction of flow to assist in migration of oil droplets as they coalesce and migrate towards upper edges of the sheet members where they coalesce into droplets or globules and break their adherence to the upper edges to then rise to the water surface.

Once the emulsified oil within the water flow coalesces within the coalescing pack and is separated as oil droplets or globules, they flow upwardly to the water surface within the coalescing chamber due to their reduced specific gravity. The water flow upon leaving the coalescing pack is directed downwardly from an uppermost edge of the first weir partition, that is, to diverge from the oil droplets rising to the water surface, so as to pass into an inlet aperture of an angled or arcuate tube or other conduit passing over or through a third downstream partition, namely, a second weir partition so as to flow into a third downstream chamber, namely, an outlet chamber.

The inlet aperture of the angled or arcuate conduit is spaced above the base level a fourth distance, and the outlet of the angled or arcuate conduit is spaced above the base level a fifth distance.

The outlet end of the angled or arcuate conduit advantageously flows into the outlet chamber but may provide directly the outlet from the rigid container. Advantageously however, water flows into the outlet chamber and passes from the outlet chamber so as to exit as effluent from rigid container 10 via a rigid outlet conduit having a lowermost inlet aperture spaced above the base level a sixth distance.

Thus in terms of relative distances spaced above the base level, advantageously, the first distance is less than the fifth distance, and the first and fifth distances are both greater than the second, third, fourth and sixth distances. Advantageously, the third distance is greater than the second and fourth distances. The second and fourth distances may be approximately equal. The third distance may be almost double the second distance.

DETAILED DESCRIPTION OF THE PREFERRED EMBODIMENT

The problem faced by the applicant was to design an oil interceptor to be continuously and consistently produced from an influent that:

a) flows either continuously or intermittently at a maximum of between 230 l/min (50 G.P.M.) and 680 l/min (150 G.P.M.);

b) contains hydrocarbons with a specific gravity of up to 0.95;

c) is a minimum temperature of 5 degrees Celsius;

d) contains free and mechanically emulsified oils in droplets to minimum of 150 microns (0.15 millimetres) in diameter;

e) contains oils up to a concentration of 40,000 PPM.

From the above influent an effluent as to be created that:

a) has a maximum THE of 10 to 15 mg/litre;

b) has a maximum suspended solid discharge of 600 mg/litre in a one day composite.

The oil interceptor produced to meet these specifications must also provide:

a) a life cycle/cost ratio superior to existing systems that are readily available;

b) be of a practical size meeting the criteria:

i) rectangular in design with a maximum length of 102 inches so as to fit on a standard truck deck of 8 feet 6 inches, maximum width of 60 inches and height of 52 inches so as to maximize deck space and thereby provide economical hauling capacity;

ii) be handled by standard site excavating equipment;

c) accept H20 loading.

Applicant calculated the rate of rise of oil droplets at a minimum influent temperature of 5 degrees Celsius. This data was correlated with different influent flow rates to optimize partition placement and well size, baffle height and placement, and tee placement and depths for clearwell inlet and outlet.

Figure 1:
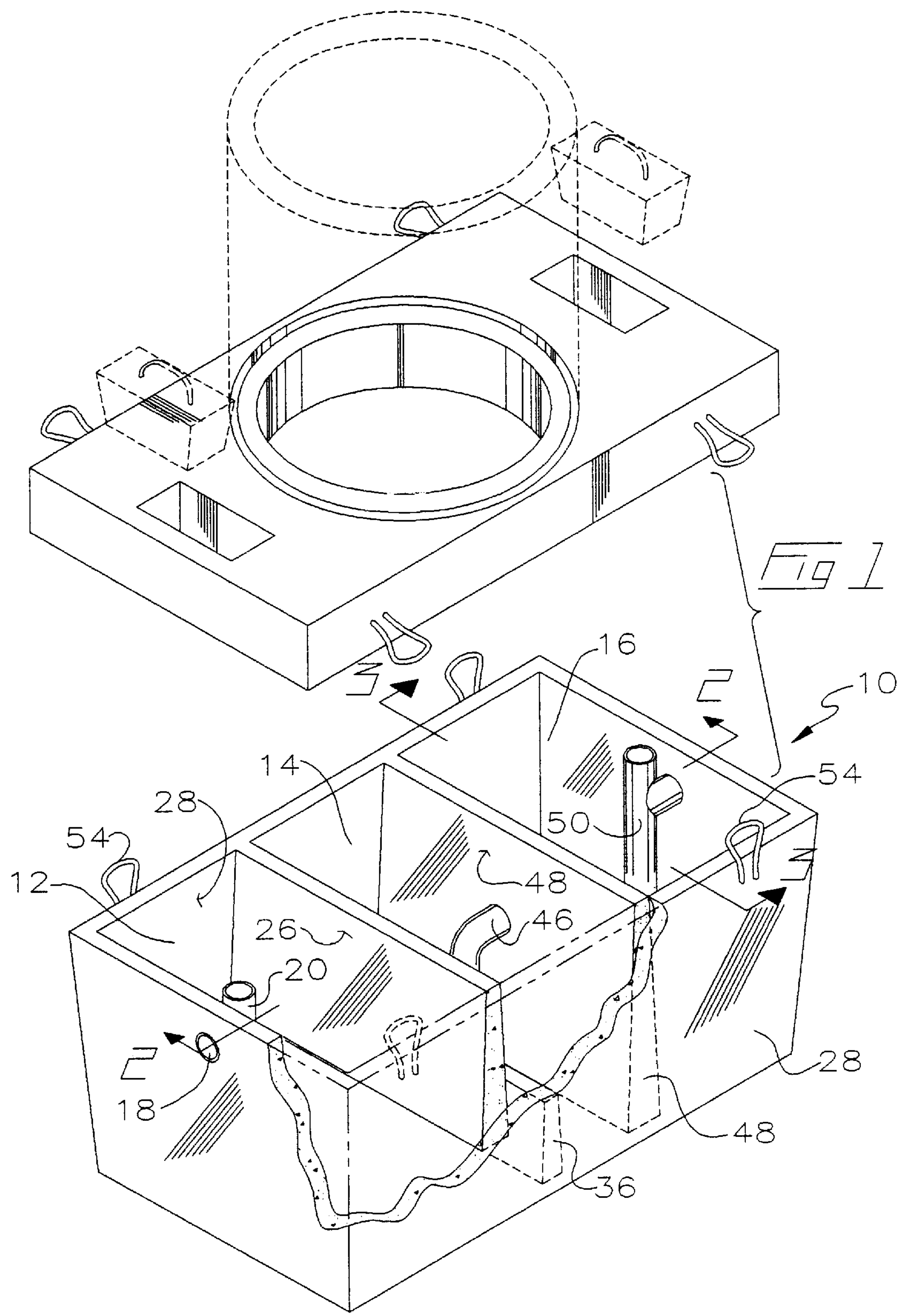
FIG. 1 is an exploded view partially cut-a-way of the Oil/Water Separator of the present invention.
Figure 2:
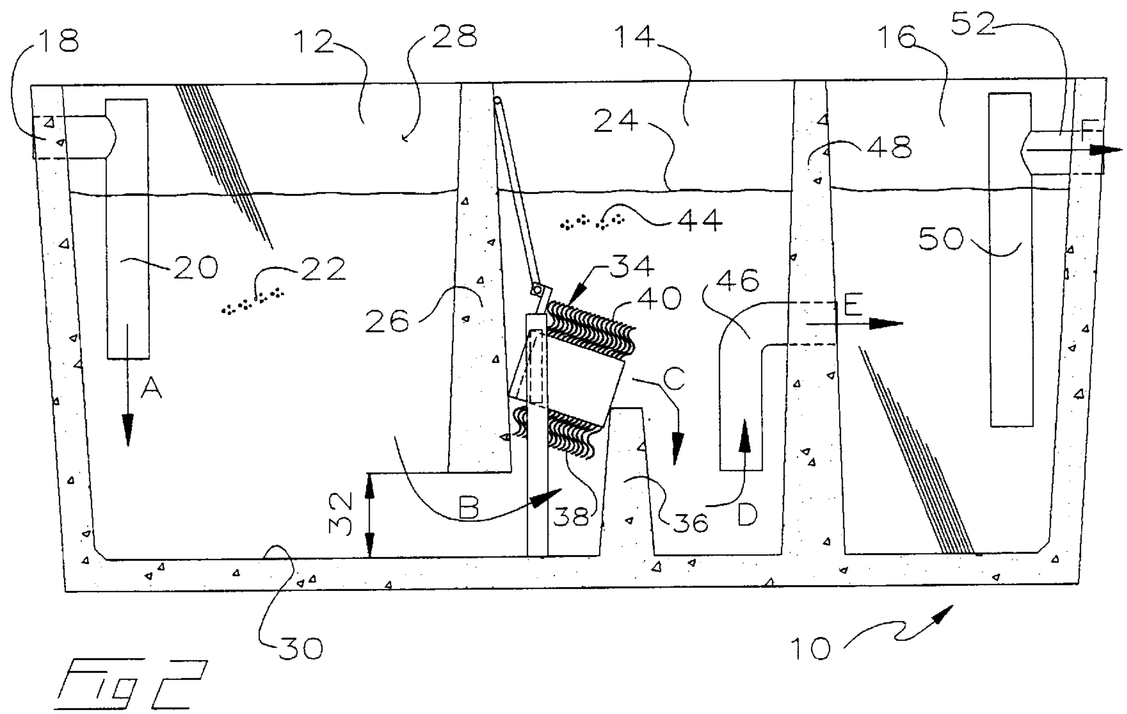
FIG. 2 is a sectional view along line 2—2 in FIG. 1.
Figure 3:
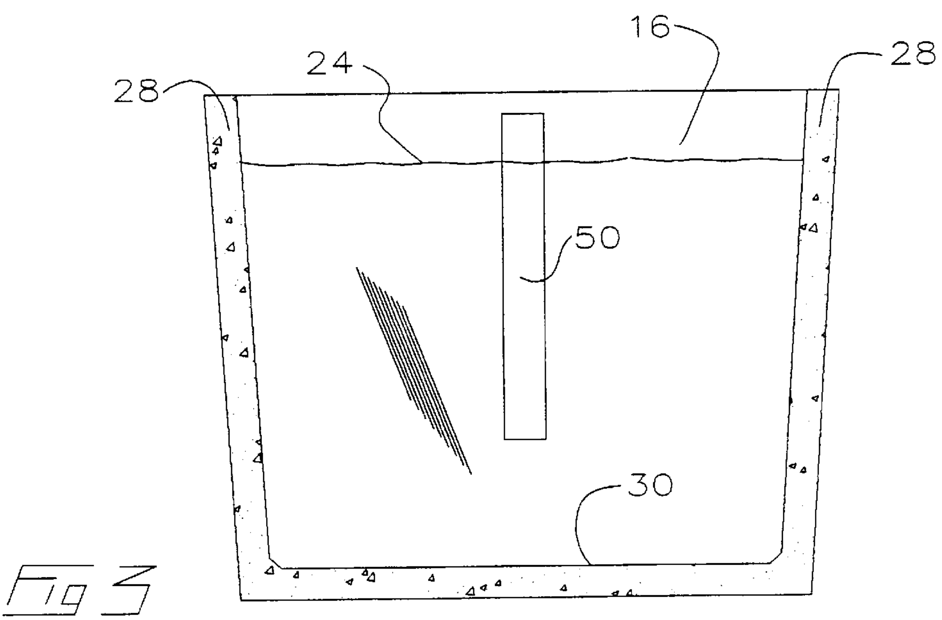
FIG. 3 is a sectional view along line 3—3 in FIG. 1.

As may be seen in FIGS. 1–3, the Oil/Water Separator of the present invention is contained within a portable self-contained tank structure 10. Tank 10 is partitioned to provide, in one preferred embodiment, three chambers, each in fluid communication with the adjacent chamber, namely, reservoir chamber 12, coalescing chamber 14, and outlet chamber 16.

Water influent enters reservoir chamber 12 via inlet port 18 and inlet tube 20. Influent flows into reservoir chamber 12 from the lower end of inlet tube 20 in direction A. In the example illustrated the lower end of inlet tube 20 is vertically spaced 19 inches above the floor 30 of the tank. Any surging caused by influent exiting inlet tube 20 in direction A into reservoir chamber 12, is settled out within reservoir chamber 12, and any non-emulsified oil 22 floats to water surface 24 as droplets which may be mechanically skimmed.

Water flows from reservoir chamber 12 into coalescing chamber 14 in water flow direction B under a rigid separating partition such as baffle 26. Baffle 26 is rigidly mounted to side walls 28 of tank 10. Baffle 26 is truncated along its lowermost edge above the floor 30 of tank 10 a vertical separation distance 32 which may in the example illustrated be 8 inches.

A coalescing pack 34 is removably mounted in coalescing chamber 14 in the water flow path between the lowermost end of baffle 26 and a rigid separating partition such as first weir baffle 36 mounted rigidly to floor 30 so as to extend generally vertically therefrom into coalescing chamber 14. First weir baffle 36 provides a solid partition extending between opposite side walls 28 to thereby force water to flow through coalescing pack 34. In the example illustrated, first weir baffle 36 extends approximately 14 inches vertically above floor 30.

Figures 4, 5, 6:
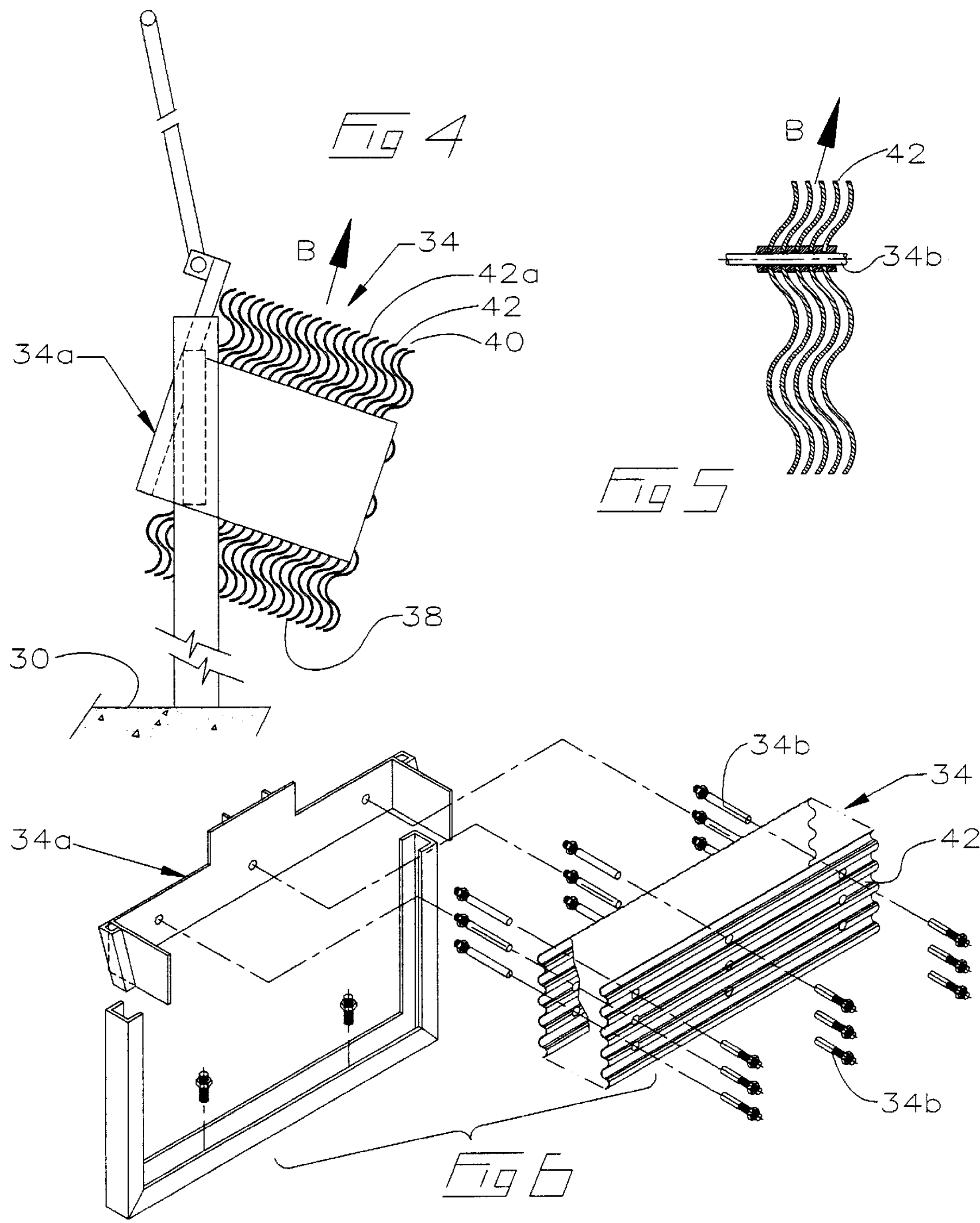
FIG. 4 is a side elevation view of the coalescing pack and frame used in the Oil/Water Separator of the present invention.
FIG. 5 is an enlarged sectional view of the spaced array of laminar flow sheets of the coalescing pack of FIG. 4.
FIG. 6 is an exploded perspective view of the coalescing pack and frame of FIG. 4.

As better seen in FIGS. 4–6, coalescing pack 34 may be generally parallel rigid sheets 42 mounted within a supporting structure such as aluminium frame 34*a*, in generally parallel spaced apart array so as to extend between an influent flow end 38 and an effluent flow end 40. Pins 34*b*, which may be ¼ inch diameter nylon rods, may be rigidly mounted so as to extend through coalescing pack 34 for holding sheets 42 in parallel ⅜ inch spaced apart array by the use of ⅜ inch spacers. Water flowing in direction B flows through coalescing pack 34 from influent flow end 38 so as to exit from effluent flow end 40, passing, therebetween in the generally parallel channels formed between the spaced apart array of rigid sheet members 42. Upwardly inclining pack 34 so that end 40 is above end 38 assists the migration of oil droplets as they coalesce on the sheets, urged along by the water flow. Sheet members 42 may, as illustrated, be 1/32 inch thick PVC sheets mounted in the closely spaced apart array so as to thereby maintain laminar water flow therebetween. Emulsified oil forms into droplets on the surfaces of the sheets as the water passes through coalescing pack 34. Oil droplets or globules 44 are thereby formed, finally coalescing on the downstream edges 42*a* of sheets 42 until their adhesion to the edge is broken and they float to the water surface in coalescing chamber 14 because of their reduced specific gravity (less than 0.95). Oil droplets 44 may be thereafter mechanically skimmed from the water surface.

As may be seen in FIGS. 4 and 5, rigid sheet members 42 need not necessarily be planar sheets but may be corrugated sheets so long as they are mounted to provide generally parallel spaced apart channels adapted to maintain a laminar flow therebetween so as to not turbulently re-emulsify the oil and water passing through coalescing pack 34. The general specifications of effluent flow and separation of oil through tank 10 are as follows when using 4 inch piping:

(a) Maximum flow rate: 50 G.P.M. (230 1/min)
(b) Influent Temperature: 40° F. (5° C.) & Greater
(c) Influent Oil Specific Gravity: <0.95
(d) Effluent Quality: <0.08 Oz/gal. (<10 mg/I) TEH
(e) Safe Oil Storage: 200 Imp. Gal. (910 L)
(f) Sludge Capacity: 12.75 cu. ft. (0.36 cu. m.)
(g) Piping: 4" PVC when using 6 inch piping:

(a) Maximum flow rate: 150 G.P.M. (680 /min)
(b) Influent Temperature: 40° F. (5° C.) & Greater
(c) Influent Oil Specific Gravity: <0.95
(d) Effluent Quality: <0.08 Oz/gal. (<10 mg/I) THE
(e) Safe Oil Storage: 117 Imp. Gal. (530 L)
(f) Sludge Capacity: 10.0 cu. ft. (0.28 cu. m.)
(g) Piping: 6" PVC Further specifications respecting the effluent flow and separation of oil through are as follows:

(a) Scour at safe oil storage volume: <10 mg./litre TEH
(b) <10 mg./Litre TEH
(c) Up to 40,000 mg./Litre Influent Oil at 50 G.P.M.
(d) Up to 30,000 mg./litre influent oil at 150 G.P.M.
(e) <100 mg./Litre TSS *
(f) Up to 20,000 mg./Litre Influent TSS
(g) Actual worst case measurement of THE/TSS: <4.0 mg/l THE and <6.0 mg/1 TSS When the coalescing pack is used in either tank configuration the improvement in effluent quality is 100% to 300% depending on flow.

Separation of oil droplets 44 from the water flow exiting coalescing pack 34 and passing over first weir partition 36 in direction C is facilitated by the fact that the oil droplets are rising and the water flow path in direction C is in an opposite direction, that is, diverging, so as to enter into the lowermost end of hollow weir tube 46 in direction D. Weir tube 46 may be formed as shown as a right angle tube so as to pass through a rigid separating partition such as second weir partition 48, the water flow exiting in direction E into outlet chamber 16. Advantageously, the lowermost inlet end of weir tube 46 is located below the uppermost edge of first weir partition 36 as for example as illustrated in FIG. 2, the inlet end is spaced above floor 30 by approximately 8 inches. The outlet end of weir tube 46 is advantageously spaced above floor 30 a distance greater than the distance the outlet end of inlet tube 20 is spaced above floor 30. For example, as illustrated in FIG. 2, the outlet end of inlet tube 20 may be spaced above floor 30 by 19 inches, and the outlet end of weir tube 46 may advantageously may then be spaced above floor 30 by approximately 20 inches.

Water in outlet chamber 16 then flows from tank 10 via outlet tube 50 in direction F through outlet port 52.

Lifting handles 54 may be provided to assist in transportation of tank 10. Tank 10 may be constituted of concrete, mesh reinforced in a manner known in the art. A lid may be provided.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An Oil/Water Separator comprising a portable container having rigid sides defining a flow inlet end at an upstream end and an outlet end at an opposite downstream end, said rigid sides including laterally spaced apart side walls and a rigid floor, rigid separating partitions extending in spaced array between said upstream and said downstream ends between said side walls so as define at least two chambers in an adjacent array in a downstream direction, said chambers separated by said rigid separating partitions rigidly mounted to, so as to extend between said opposite side walls, said chambers connected in fluid communication therebetween so that influent water containing oil to be separated enters a first upstream chamber, and is deposited into said first upstream chamber a first distance above said floor, said floor extending generally horizontally the length of said container so as to provide a base level in each of said chambers, said separating partitions including a first partition separating said first upstream chamber from an adjacent downstream coalescing chamber, said first partition having an opening under a lowermost edge thereof, between said lowermost edge and said floor, said lowermost edge of said first partition spaced above said base level a second distance, whereby water passes under said first partition in a water flow path from said first upstream chamber into said coalescing chamber, a coalescing pack mountable in said water flow path, mountable so as to be releasably rigidly mounted between said first partition and a second partition of said separating partitions rigidly mounted to said floor so as to extend generally vertically into said coalescing chamber a third distance above said base level, wherein said coalescing pack is a rigid spaced apart array of rigid sheet members supported in closely spaced apart relation so as to define between said rigid sheet members in said spaced apart array an array of cavities, each sized to maintain laminar flow between each of said rigid sheet members, thereby allowing water flowing along said water flow path to flow through said cavities in a generally laminar flow, whereby emulsified oil within said water flow coalesces within said coalescing pack so as to be separated as oil droplets having a reduced relative specific gravity, thereby flowing upwardly out of said water flow path to a water surface within said coalescing chamber, a downstream third partition of said separating partitions mounted between said side walls so as to form a downstream wall of said coalescing chamber, a water conduit mounted through said third partition, and angled upwardly from an inlet aperture to an outlet aperture, said inlet aperture of said water conduit spaced above said base level a fourth distance, said outlet of aperture of said water conduit spaced above said base level a fifth distance, said water flow path downstream of said coalescing pack, angling downwardly from an uppermost edge of said second partition to said inlet aperture of said water conduit, said first distance less than said fifth distance, and said first and fifth distances both greater than said second, third, and fourth distances.

2. The Oil/Water Separator of claim 1 wherein said rigid sheet members are corrugated and mounted within said coalescing pack so as to maintain said sheet members in generally parallel relation.

3. The Oil/Water Separator of claim 1 wherein said third distance is greater than said second distance and said third distance is greater than said fourth distance.

4. The Oil/Water Separator of claim 3 wherein said second distance is generally equal to said fourth distance.

5. The Oil/Water Separator of claim 4 wherein said third distance is generally double said second distance.

6. The Oil/Water Separator of claim 1 further comprising an outlet chamber adjacent and downstream of said coalescing chamber, an outlet conduit a in downstream-most end-wall of said container in fluid flow communication between said outlet chamber and the exterior of said container for passing effluent from said container, said outlet conduit having a lower end in said outlet chamber and an upper end at an opposite end of said outlet conduit, said lower end of said outlet conduit having a lower-most inlet aperture spaced a sixth distance above said base level, said fifth distance greater than said sixth distance.

7. The Oil/Water Separator of claim 6 wherein said rigid sheet members are corrugated and mounted within said coalescing pack so as to maintain said sheet members in generally parallel relation.

8. The Oil/Water Separator of claim 6 wherein said third distance is greater than said second distance and said third distance is greater than said fourth distance.

9. The Oil/Water Separator of claim 8 wherein said second distance is generally equal to said fourth distance.

10. The Oil/Water Separator of claim 9 wherein said third distance is generally double said second distance.

11. The Oil/Water Separator of claim 1, wherein said first upstream chamber is a reservoir chamber, and wherein said first partition is a baffle, and said second partition is a weir partition.

12. The Oil/Water Separator of claim 11 wherein said coalescing pack is sized to snugly fit between a lower portion of said baffle and an upper portion of said second partition.

13. The Oil/Water Separator of claim 12 wherein said water conduit is generally arcuate weir tube extending upwardly from said inlet aperture of said water conduit so as to extend generally horizontally through said third partition.

14. The Oil/Water Separator of claim 13 wherein an upstream end wall of said container has an inlet conduit therethrough extending between an upper inlet conduit inlet aperture and a lower inlet conduit outlet aperture at said first distance above said floor.

15. The Oil/Water Separator of claim 14 wherein said inlet conduit is a tube, a lower portion of said tube extending generally vertically into said reservoir chamber adjacent said upstream end wall.

16. The Oil/Water Separator of claim 6, wherein said first upstream chamber is a reservoir chamber, and wherein said first partition is a baffle, said second partition is a first weir partitions and said third partition is a second weir partition.

17. The Oil/Water Separator of claim 16 wherein said coalescing pack is sized to snugly fit between a lower portion of said baffle and an upper portion of said first weir partition.

18. The Oil/Water Separator of claim 17 wherein said water conduit is a generally arcuate weir tube extending upwardly from said inlet aperture of said water conduit so as to extend generally horizontally through said second weir partition.

19. The Oil/Water Separator of claim 18 wherein an upstream end wall of said container has an inlet conduit therethrough extending between an upper inlet conduit inlet aperture and a lower inlet conduit outlet aperture at said first distance above said floor.

20. The Oil/Water Separator of claim 19 wherein said inlet conduit is a tube, a lower portion of said tube extending generally vertically into said reservoir chamber adjacent said upstream end wall.

21. The Oil/Water Separator of claim 1 wherein said rigid spaced apart array of rigid sheet members are parallel and spaced generally ¼ inch apart.

22. The Oil/Water Separator of claim 21 wherein said rigid sheet members are corrugated sheets.

23. The Oil/Water Separator of claim 22 wherein said rigid sheet members are PVC sheets.

24. The Oil/Water Separator of claim 1 wherein said rigid spaced apart array of rigid sheet members are parallel and upwardly inclined in the direction of flow through said coalescing pack.

* * * * *